UNITED STATES PATENT OFFICE.

HUGH RODMAN, OF EDGEWOOD, PENNSYLVANIA, ASSIGNOR TO RODMAN CHEMICAL COMPANY, A CORPORATION OF PENNSYLVANIA.

CASE-HARDENING MATERIAL.

1,076,235.  Specification of Letters Patent.  Patented Oct. 21, 1913.

No Drawing.  Application filed May 1, 1913. Serial No. 764,880.

*To all whom it may concern:*

Be it known that I, HUGH RODMAN, a citizen of the United States, and a resident of Edgewood, in the county of Allegheny and State of Pennsylvania, have made a new and useful Invention in Case-Hardening Material, of which the following is a specification.

This invention relates to a new and useful material for carbonizing by dry-packing and to a new art of preparing it.

Many finely powdered materials which are chemically satisfactory are commercially unsatisfactory because of dustiness. This dustiness makes handling difficult, lowers the thermal conductivity and favors separation of particles of different size and density. On account of the difficulty in handling, as well as other objectionable features, it is desirable to bring the material together in the form of small masses of approximately uniform size and thereby eliminate the dust. Previous to this invention I have made use of dustlike material by transforming it into relatively large masses and then crushing the relatively large masses into smaller masses. In actual practice I have found that such treatment has some objection on account of the irregular section of the crushed small masses which contain edges and points. There is some difficulty in packing and settling uniformly in the pots and in use the edges and points easily break off and are reduced to dust.

One of the objects of my invention is to eliminate this dustiness and to increase the uniformity and thermal conductivity of the material. I have found that the result can be obtained by making the carbonizing material in the form of small pebbles or pills of approximately spherical shape, or at any rate, of such shapes that their edges will be rounded. This reduces the tendency to form dust, facilitates packing and serves to maintain a high thermal conductivity.

One method of producing the material in the desired form is as follows: Mix one hundred (100) parts of finely powdered coking coal (preferably fine enough to pass through a screen having at least 100 wires to the linear inch) with ten (10) parts of sodium carbonate and fifteen (15) parts of calcium carbonate or hydroxid. Moisten the dry mixture with a tacky binder, such, for example, as a solution of molasses in water, force the moist mass through screens having four wires to the linear inch, and then tumble in revolving barrels occasionally sprinkling in some dry mixture till rounded or compacted into firm pebbles. Undersize and oversize pebbles are then screened out and returned to the mixers while pebbles of approved size, which may be $\frac{1}{16}''$ or $\frac{1}{4}''$ in diameter, are dried with gentle heat, or, if desired, they may be coked by heating to about 1500° Fahrenheit. The molasses and carbonates or hydroxids react to form a bond which allows the coal to coke internally within the surface of each pebble, but prevents any deformation or disintegration of individual pebbles or adherence of adjacent pebbles, that is, each pebble cokes individually, binding and hardening all of the material within its own surface, but the pebble does not adhere, cohere or coke to adjacent pebbles.

Other methods of making approximately spherical small masses will occur to those skilled in the art.

Having thus described my invention, what I claim is:

1. As a new article of manufacture, case-hardening material consisting of small rounded masses of appreciable size.

2. As a new article of manufacture, case-hardening material consisting of small spherical masses of appreciable size.

3. As a new article of manufacture, case-hardening material in the form of small rounded pebbles, each pebble consisting of finely divided material held together by a tacky binder.

4. As a new article of manufacture, case-hardening material consisting of small rounded coked masses of appreciable size.

5. As a new article of manufacture, case-hardening material consisting of small rounded masses of appreciable size having a coking interior and a non-coking exterior.

6. As a new article of manufacture, case-hardening material consisting of small spherical masses of appreciable size having coking interiors and non-coking exteriors.

7. As a new article of manufacture, case-hardening material containing coking coal, consisting of small rounded masses.

8. As a new article of manufacture, case-hardening material containing coking coal, sodium carbonate and calcium carbonate, consisting of small rounded masses of appreciable size.

9. As a new article of manufacture, case-hardening material in the form of small rounded pebbles, each pebble consisting of finely divided material held together by a tacky binder consisting of molasses.

10. As a new article of manufacture, case-hardening material in the form of small rounded pebbles, each pebble consisting of finely divided material containing coking coal held together by a tacky binder.

11. As a new article of manufacture, case-hardening material in the form of small rounded pebbles, each pebble consisting of finely divided material containing coking coal held together by a tacky binder consisting of molasses.

In testimony whereof, I have hereunto subscribed my name this 29th day of April, 1913.

HUGH RODMAN.

Witnesses:
C. W. McGhee,
Ada Romig.